(12) United States Patent
Riviere et al.

(10) Patent No.: US 9,186,733 B2
(45) Date of Patent: Nov. 17, 2015

(54) CUTTING INSERT WITH EVOLUTIVE WEDGE OR CLEARANCE ANGLE AND TOOLHOLDER USING SUCH A CUTTING INSERT

(75) Inventors: Bertrand Riviere, Bourges (FR); Francois Auzenat, Bourges (FR); Thomas Norstrom, Fagersta (SE)

(73) Assignee: SECO TOOLS AB, Fagersta (SE)

(*) Notice: Subject to any disclaimer, the term of this patent is extended or adjusted under 35 U.S.C. 154(b) by 180 days.

(21) Appl. No.: 13/885,736

(22) PCT Filed: Nov. 8, 2011

(86) PCT No.: PCT/EP2011/069675
§ 371 (c)(1),
(2), (4) Date: May 16, 2013

(87) PCT Pub. No.: WO2012/065884
PCT Pub. Date: May 24, 2012

(65) Prior Publication Data
US 2014/0003874 A1    Jan. 2, 2014

(30) Foreign Application Priority Data
Nov. 19, 2010    (EP) .................................. 10191799

(51) Int. Cl.
*B23C 5/22* (2006.01)
*B23C 5/20* (2006.01)
*B23C 5/10* (2006.01)

(52) U.S. Cl.
CPC ................ *B23C 5/207* (2013.01); *B23C 5/109* (2013.01); *B23C 2200/045* (2013.01); *B23C 2200/125* (2013.01); *B23C 2200/126* (2013.01); *B23C 2200/168* (2013.01); *B23C 2200/243* (2013.01); *Y10T 407/1934* (2015.01); *Y10T 407/20* (2015.01)

(58) Field of Classification Search
CPC .................................. B23C 5/22; B23B 27/16
USPC .................. 407/113, 101–104, 35, 43, 64, 65
See application file for complete search history.

(56) References Cited

U.S. PATENT DOCUMENTS

| | | | | |
|---|---|---|---|---|
| 4,294,565 | A | * | 10/1981 | Erkfritz ......................... 407/113 |
| 4,963,061 | A | * | 10/1990 | Katbi et al. ................... 407/114 |
| 5,199,827 | A | | 4/1993 | Pantzar |
| 5,222,843 | A | * | 6/1993 | Katbi et al. ................... 407/114 |
| 5,230,591 | A | * | 7/1993 | Katbi et al. ................... 407/114 |
| 5,346,336 | A | * | 9/1994 | Rescigno ...................... 407/104 |
| 5,718,540 | A | * | 2/1998 | Satran et al. ................... 407/42 |

(Continued)

FOREIGN PATENT DOCUMENTS

| CN | 1223185 A | 7/1999 |
|---|---|---|
| CN | 101516555 A | 8/2009 |

(Continued)

*Primary Examiner* — Sunil K Singh
*Assistant Examiner* — Sara Addisu
(74) *Attorney, Agent, or Firm* — Corinne R. Gorski

(57) ABSTRACT

A circular cutting insert includes a top surface having a top edge portion, a side surface having a clearance surface and a clearance edge portion. A cutting edge is formed between the clearance edge portion and the top edge portion. The clearance edge portion and the top edge portion form a wedge angle. The wedge angle varies as a function of circumferential position about a central axis of the insert relative to a point on the cutting edge.

11 Claims, 8 Drawing Sheets

(56) References Cited

U.S. PATENT DOCUMENTS

| | | | |
|---|---|---|---|
| 5,720,583 | A | 2/1998 | Bonnet |
| 5,725,334 | A | 3/1998 | Paya |
| 5,904,450 | A * | 5/1999 | Satran et al. .................. 407/113 |
| 6,050,751 | A * | 4/2000 | Hellstrom ..................... 407/104 |
| 6,164,878 | A * | 12/2000 | Satran et al. .................. 407/113 |
| 6,238,133 | B1 * | 5/2001 | DeRoche et al. ........... 403/359.1 |
| 6,540,448 | B2 * | 4/2003 | Johnson ........................... 407/35 |
| 6,607,334 | B2 | 8/2003 | Satran et al. |
| 6,796,750 | B2 * | 9/2004 | Men ................................. 407/35 |
| 6,884,006 | B2 * | 4/2005 | Nagashima ..................... 407/34 |
| 7,220,083 | B2 * | 5/2007 | Festeau et al. ................ 407/113 |
| 7,255,518 | B2 * | 8/2007 | Wallstrom et al. ............ 407/103 |
| 7,390,149 | B2 * | 6/2008 | Wihlborg ........................ 407/35 |
| 7,722,297 | B2 * | 5/2010 | Dufour et al. .................. 407/66 |
| 8,206,066 | B2 * | 6/2012 | Men et al. ..................... 407/113 |
| 8,529,168 | B2 * | 9/2013 | Michelet et al. .............. 407/113 |
| 8,882,402 | B2 * | 11/2014 | Hoffer ............................. 407/34 |
| 9,095,909 | B2 * | 8/2015 | Scandroglio .......................... 1/1 |
| 2005/0019111 | A1 * | 1/2005 | Kitagawa et al. ............. 407/113 |
| 2006/0188347 | A1 * | 8/2006 | Kratz ............................. 407/113 |
| 2006/0228179 | A1 * | 10/2006 | Alm et al. ..................... 407/113 |
| 2006/0245837 | A1 * | 11/2006 | Dufour et al. ................. 409/132 |
| 2007/0189863 | A1 | 8/2007 | Viol |
| 2012/0051853 | A1 * | 3/2012 | Scandroglio ..................... 407/47 |
| 2012/0070239 | A1 * | 3/2012 | Park et al. ........................ 407/42 |
| 2013/0315682 | A1 * | 11/2013 | Wahlsten et al. ............. 407/113 |
| 2014/0072377 | A1 * | 3/2014 | Sunnvius ......................... 407/42 |
| 2015/0165532 | A1 * | 6/2015 | Yamamoto ...................... 407/42 |

FOREIGN PATENT DOCUMENTS

| | | |
|---|---|---|
| DE | 19855103 A1 | 7/1999 |
| DE | 10006431 C1 | 9/2001 |
| DE | 102008037915 B3 | 8/2009 |
| EP | 1964631 A2 | 9/2008 |

* cited by examiner

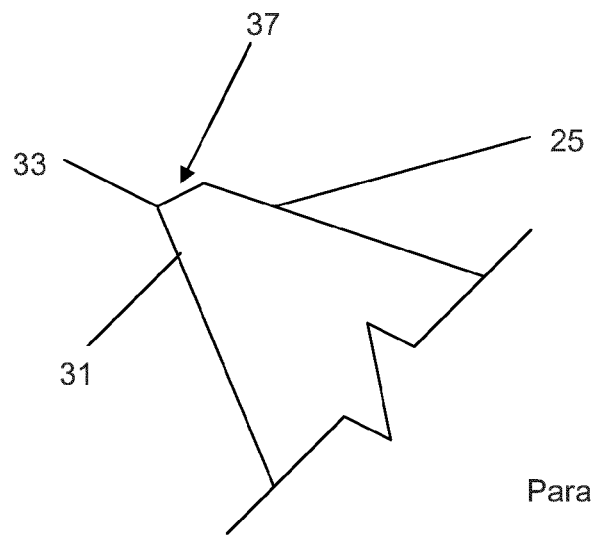
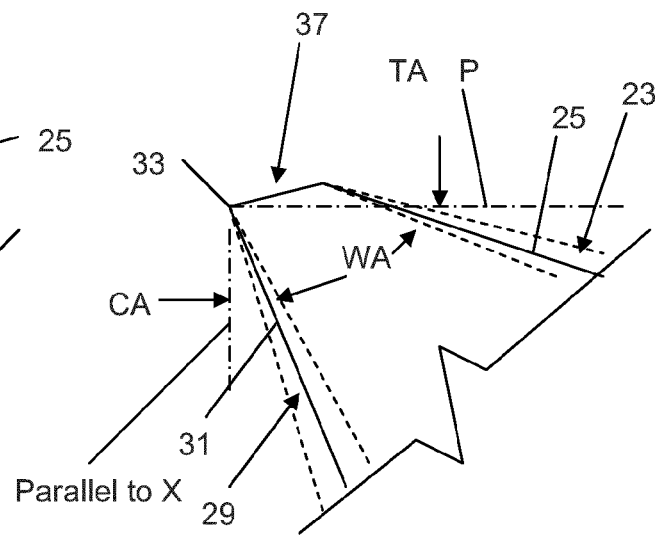
FIG. 2A  FIG. 2B

US 9,186,733 B2

CUTTING INSERT WITH EVOLUTIVE WEDGE OR CLEARANCE ANGLE AND TOOLHOLDER USING SUCH A CUTTING INSERT

RELATED APPLICATION DATA

This application is a §371 National Stage Application of PCT International Application No. PCT/EP2011/069675 filed Nov. 8, 2011 claiming priority of European Application No. 1019799.5, filed Nov. 19, 2010.

BACKGROUND AND SUMMARY

The present invention relates to cutting inserts and, more particularly, to cutting inserts having evolutive wedge and/or clearance angles.

When using rotating tools with circular cutting inserts to cut material, it is common to form the cutting insert in the form of a truncated cone. The edge of the large end of the cone typically forms the "top" of the insert, and the periphery of the top forms a cutting edge that contacts a workpiece. The cone angle, i.e., the angle between a reference plane through the top of the insert and the conical side, is typically referred to as the clearance angle of the insert. As the tool rotates, the side of the cone "follows" the cutting edge. Often, the insert is arranged at an angle to an axis of rotation and/or at an angle to a radius of the tool to facilitate use of the sharp corner or wedge angle between the top and the conical side of the insert. This typically entails tilting the insert so that the conical side of the inert is closer to the material that has just been cut by the cutting edge that it follows. While providing a narrow wedge angle will often make it easier to cut material, it will often be at the expense of strength of the cutting edge.

U.S. Pat. No. 5,725,334A discloses a circular cutting insert including a negative land 27 that varies in size around the cutting edge. The land 27 appears to form a constant, non-varying angle with the frustoconical clearance surface below the land. There is no disclosure regarding a wedge angle between a surface interior of the land 27 and the clearance surface.

DE10006431C1 discloses a circular cutting insert having a protective bevel (1) that varies in size at different points around the cutting edge.

DE19855103A1 discloses a circular cutting insert having a protective bevel 2 that varies in size at different points around the cutting edge.

EP1964631A2 discloses a circular cutting insert 1 having a top surface 2, a cutting edge 5, and clearance surface 4. The document discloses that the clearance surface may be divided into several sections, which have a different inclination relative to the base 3 and the deck surface 2, such that, at different heights of the clearance surface between the base 3 and deck 2, the clearance surface can form different angles. Such a configuration is common in cutting inserts.

U.S. Patent App. Pub. US2007/0189863A1 discloses a circular cutting insert and shows, in FIGS. 6A-6C, an insert with a cutting edge C47 that varies in height relative to a bottom of the insert around the circumference of the insert.

It is desirable to provide an insert that both facilitates cutting of a workpiece while also providing substantial cutting edge strength.

According to an aspect of the present invention, an indexable circular cutting insert includes including a land surface adjacent to a top surface including a top edge portion, a side surface including a clearance surface and a clearance edge portion, and a cutting edge defined by an intersection of the clearance edge portion and the land surface. The clearance edge portion and the top edge portion form a wedge angle. The wedge angle varies as a function of circumferential position about a central axis of the insert relative to a point on the cutting edge. The cutting insert is indexable to a plurality of different indexing positions. The wedge angle varies between a maximum and a minimum value as a function of circumferential position about the central axis of the insert relative to a point on the cutting edge corresponding to each indexing position.

BRIEF DESCRIPTION OF THE DRAWINGS

The features and advantages of the present invention are well understood by reading the following detailed description in conjunction with the drawings in which like numerals indicate similar elements and in which:

FIGS. 2A and 2B are side, cross-sectional views of a cutting edge of a cutting insert according to an aspect of the present invention;

DETAILED DESCRIPTION

FIGS. 1A-1E show a circular cutting insert 21 according to an aspect of the present invention. The insert 21 can be made of a material such as cemented carbide and can be used for metal machining operations, however, other materials can be used to form the insert, and the insert can be used for operations other than metal machining.

Figure 5A:
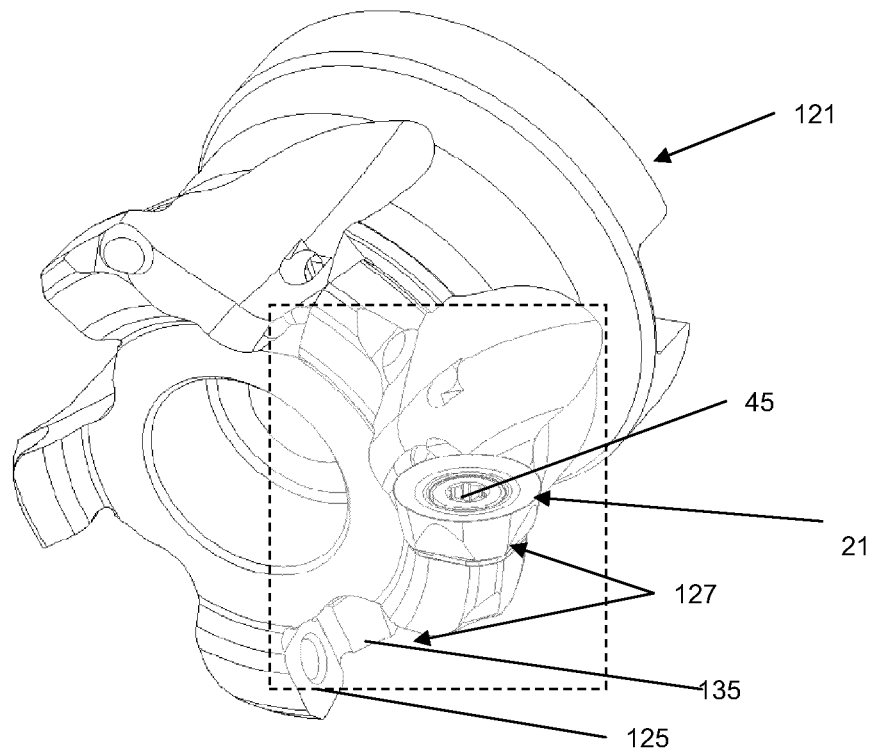
FIGS. 5A and 5B are bottom perspective and side views of a toolholder provided with a cutting insert according to an aspect of the present invention.
Figure 5B:
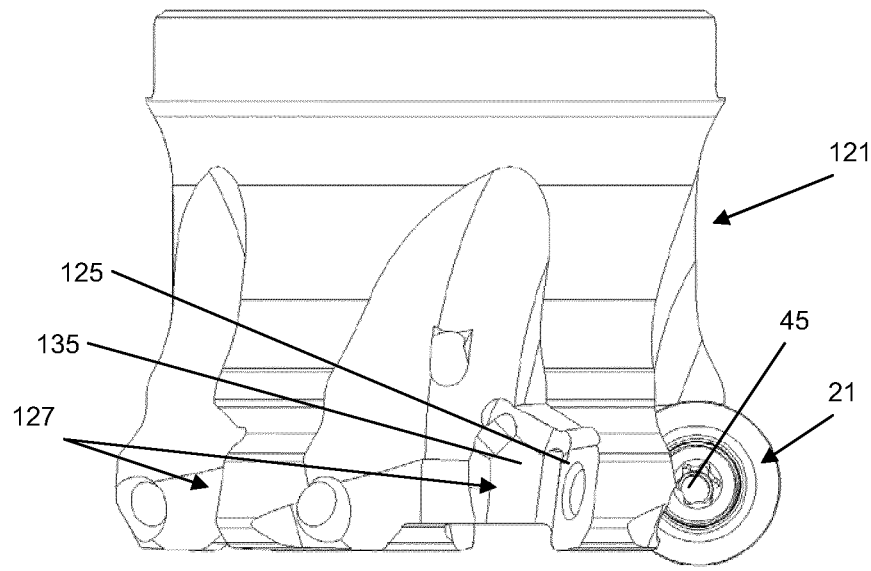
Figure 5C:
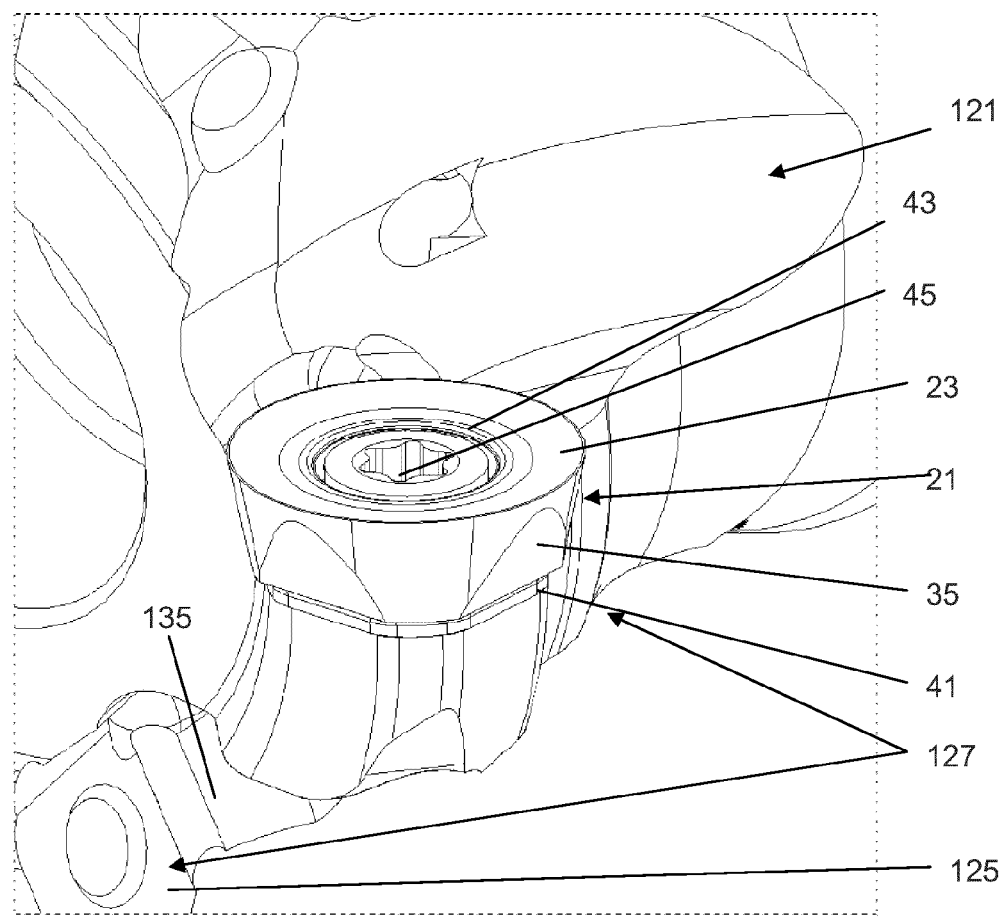
FIG. 5C is an enlarged view of a portion of FIG. 5A.
Figure 5D:
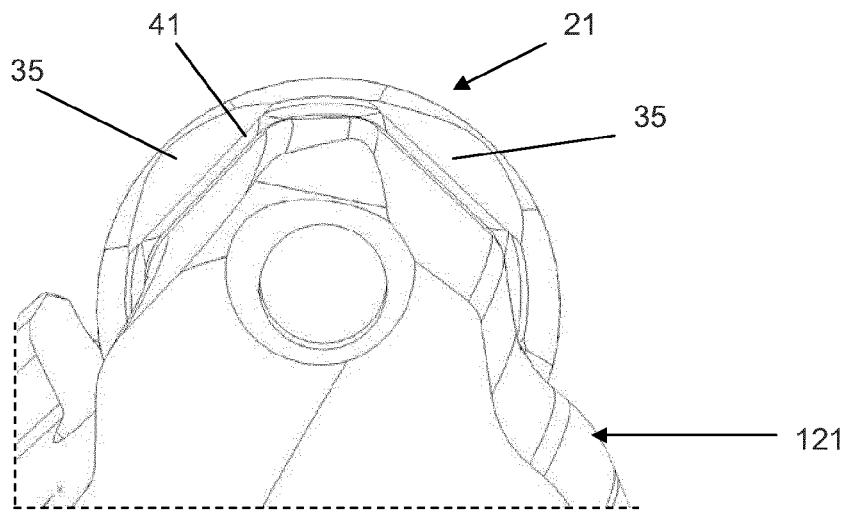
FIG. 5D is a view of a portion of the toolholder of FIG. 5A showing the insert from below a bottom thereof.

The insert 21 comprises a top surface 23 including a top edge portion 25, a side surface 27 including a clearance surface 29 and a clearance edge portion 31, and a cutting edge 33 between the clearance edge portion and the top edge portion. The cutting edge 33 will ordinarily lie substantially on a reference plane (P, FIG. 2B), however, the cutting edge may have a variety of other shapes so that parts extend above or below a reference plane. The clearance edge portion 31 and the top edge portion 25 are those portions of the clearance surface 29 and the top surface 23, respectively, immediately proximate the cutting edge 33. Often, but not always, the cutting edge 33 is defined by an intersection of the clearance edge portion 31 and the top edge portion 25. The insert will ordinarily have one or more side insert supporting surfaces 35 for supporting the insert against an abutment surface (135. FIGS. 5A-5C) in a recess (127) of a toolholder (121).

The clearance edge portion 31 and a central axis X (e.g., FIG. 3) of the insert 21 ordinarily form a non-zero clearance angle CA (e.g., FIG. 2B) which may be different than an angle formed by other portions of the clearance surface 29 more remote from the cutting edge 33. The clearance angle CA will ordinarily be between 0° and 30° and will be non-zero for a "positive" cutting insert, however, the clearance angle CA can be 0° or less (the clearance edge portion extending radially outward of the cutting edge) for other inserts. The clearance edge portion 31 and the top edge portion 25 form a wedge angle WA (e.g., FIG. 2B) which may be different than an angle formed by other portions of the clearance surface 29 and the top surface 23 more remote from the cutting edge 33.

The wedge angle between the clearance edge portion 31 and the top edge portion 25 can be "evolutive" in the sense that it varies as a function of at least circumferential position about a central axis of the insert relative to a point such as a vertex 0 of a setting angle SA. The vertex 0 of the setting angle will ordinarily be the point along the cutting edge 33 that, when the insert 21 is mounted in a toolholder (121, as seen in FIGS. 5A-5D), extends deepest into a workpiece, and the setting angle is defined as the angle measured between a plane in which the cutting insert rotates and a line from the point on the cutting edge of the insert that extends deepest into the workpiece and a point on the cutting edge at the top of the groove being formed by the insert. For purposes of discussion, except where otherwise indicated, aspects of the present invention will be described hereinafter with reference to an evolutive wedge angle that varies as a function of a circumferential position relative to a vertex 0 of the setting angle SA, it being understood that the wedge angle can be considered to vary relative to some other point on the cutting edge as the location of the vertex of the setting angle may not be easily determined for all inserts.

By providing an evolutive wedge angle, an insert having a circular cutting edge can be formed so that, when the insert is used to cut a workpiece, different points along a working portion of the cutting edge will have different wedge angles. For example, it may be desirable to provide a narrower wedge angle at the vertex of the setting angle (usually the deepest part of the cut) to facilitate cutting while providing a wider wedge angle at another portion of the working portion of the cutting edge to provide greater strength. Of course, it may, in other circumstances, be desirable to provide a wider wedge angle at the vertex of the setting angle and a narrower wedge angle at another portion of the working portion of the cutting edge, or to provide neither the narrowest nor the widest wedge angle at the vertex of the setting angle. Additionally, the evolutive wedge angle facilitates providing an insert with a true circular shape at the cutting edge of the insert when viewed along an axis of the insert with different wedge angles at different points along the cutting edge, as seen for example, in FIGS. 1C, 1E, 5B, 5D, and 6A-6B. It should be appreciated that, in addition to or instead of an evolutive wedge angle, the insert may instead or in addition have an evolutive clearance angle, and/or an evolutive a top edge surface angle between a reference plane and the top edge portion 25.

Figure 1A:
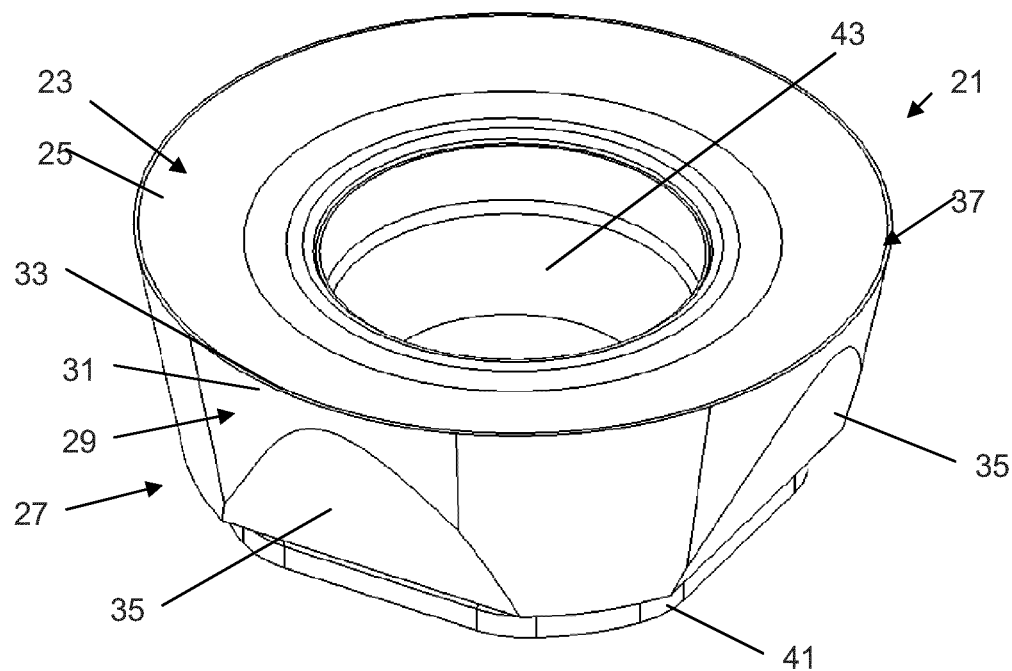
FIGS. 1A-1E are a top perspective view, a bottom perspective view, a top view, a side view, and a bottom view of a cutting insert according to an aspect of the present invention.
Figure 1B:
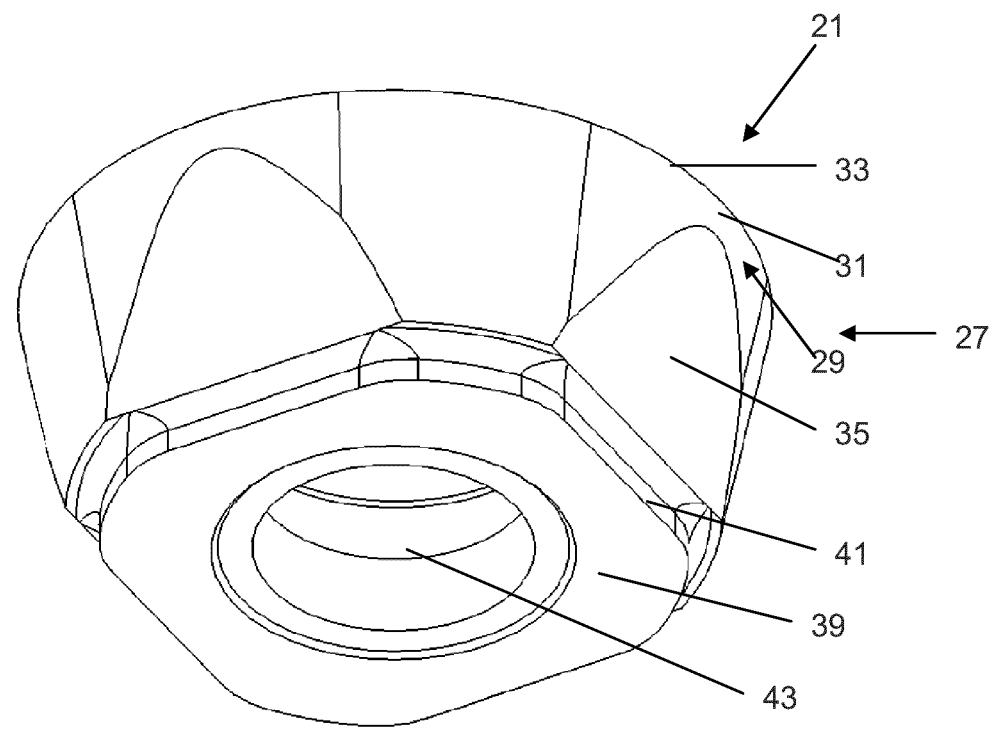
Figure 1C:
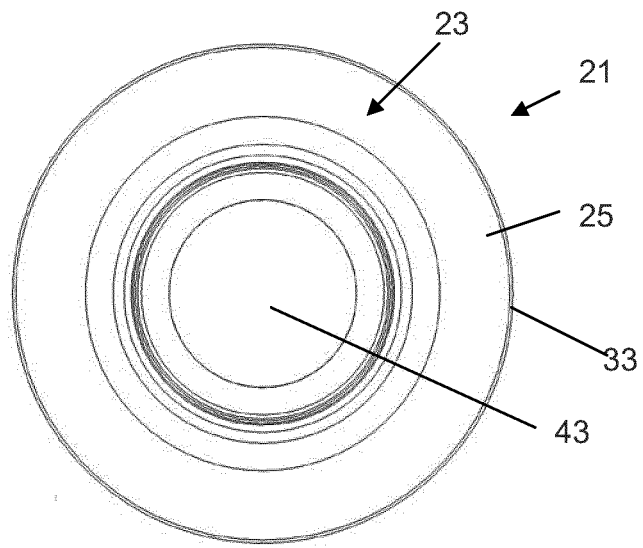
Figure 1D:
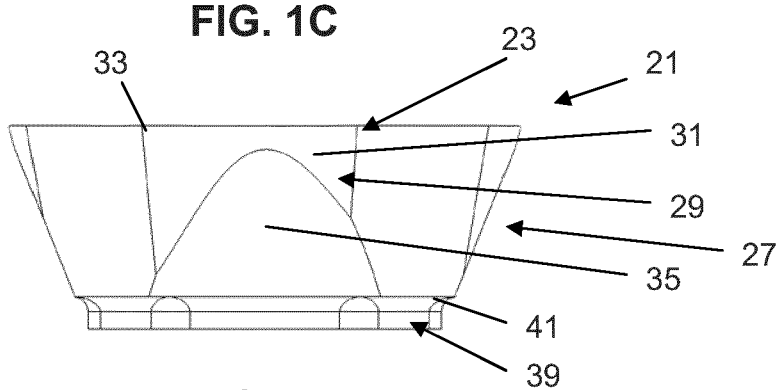
Figure 1E:
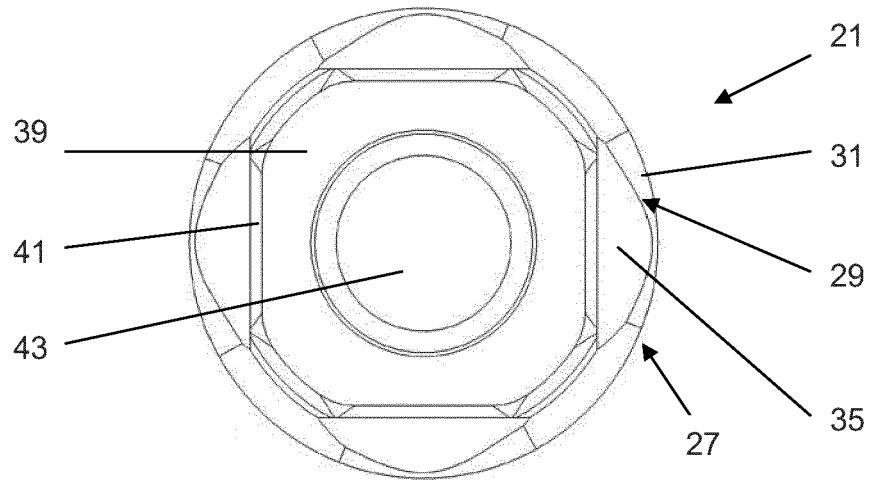
Figure 3:
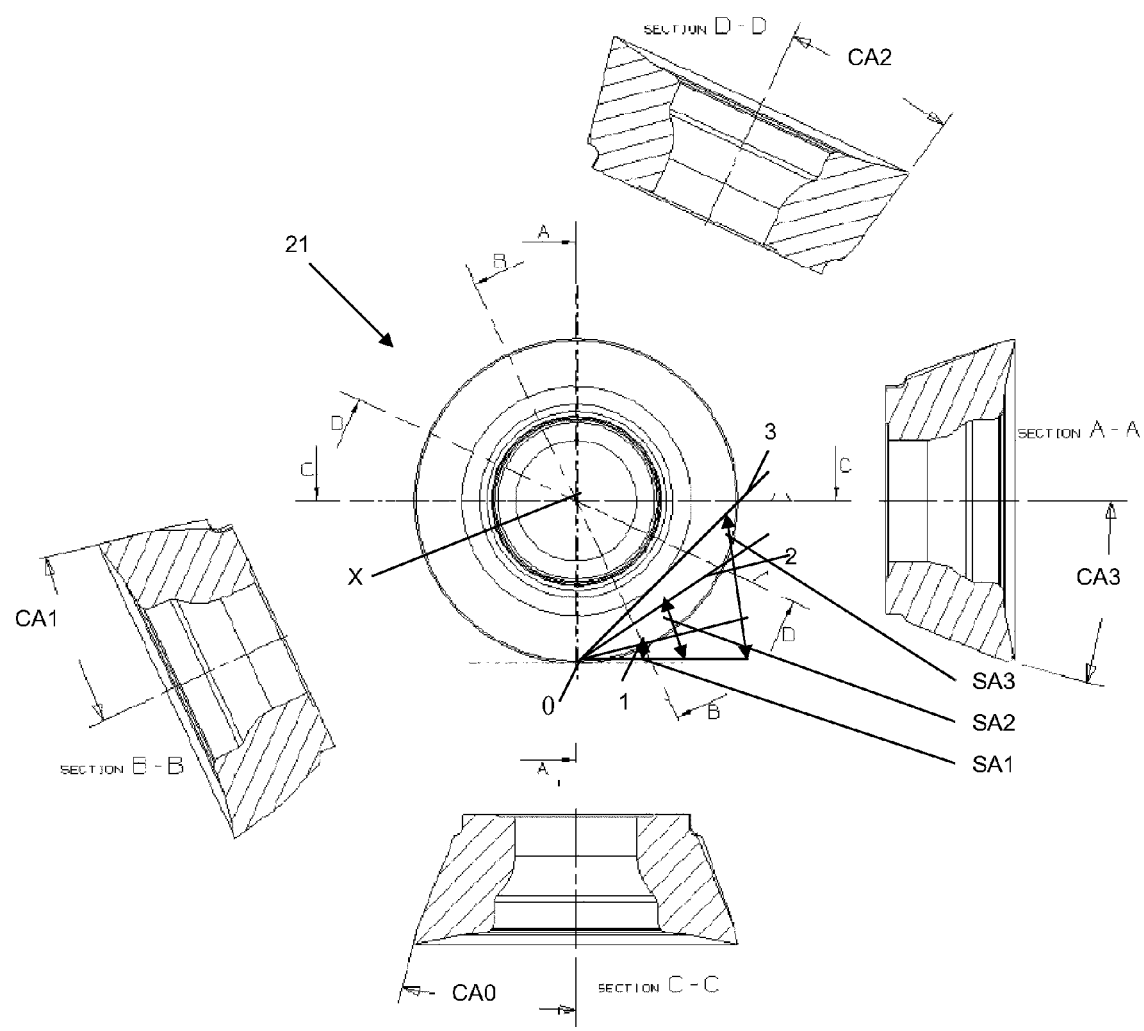
FIG. 3 shows a cutting insert and cross-sectional views thereof showing different clearance angles of the insert depending upon where the sections are taken.
Figure 6A:
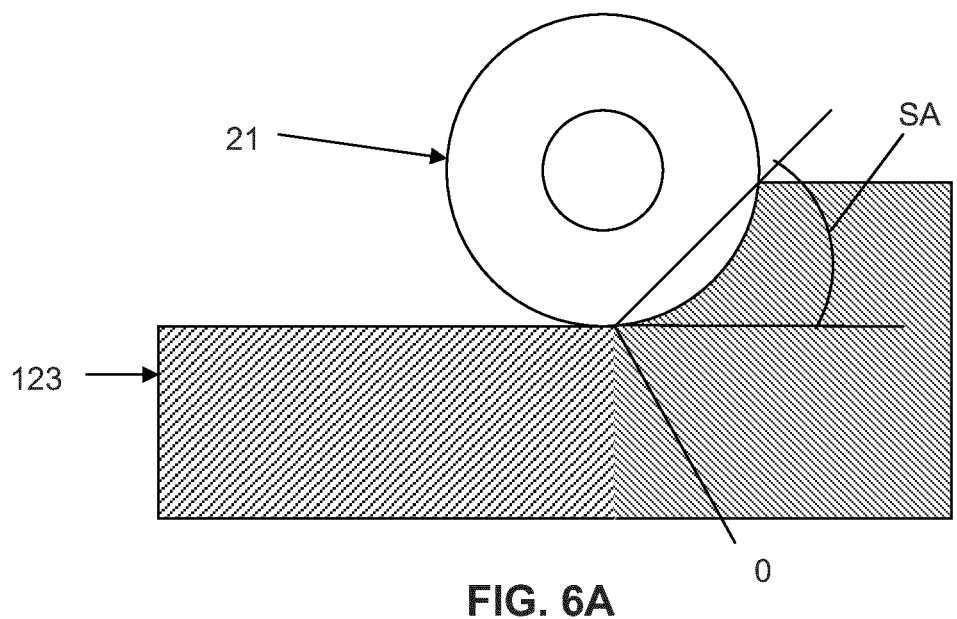
FIGS. 6A and 6B schematically show a cutting insert cutting workpieces at different cutting depths.
Figure 6B:
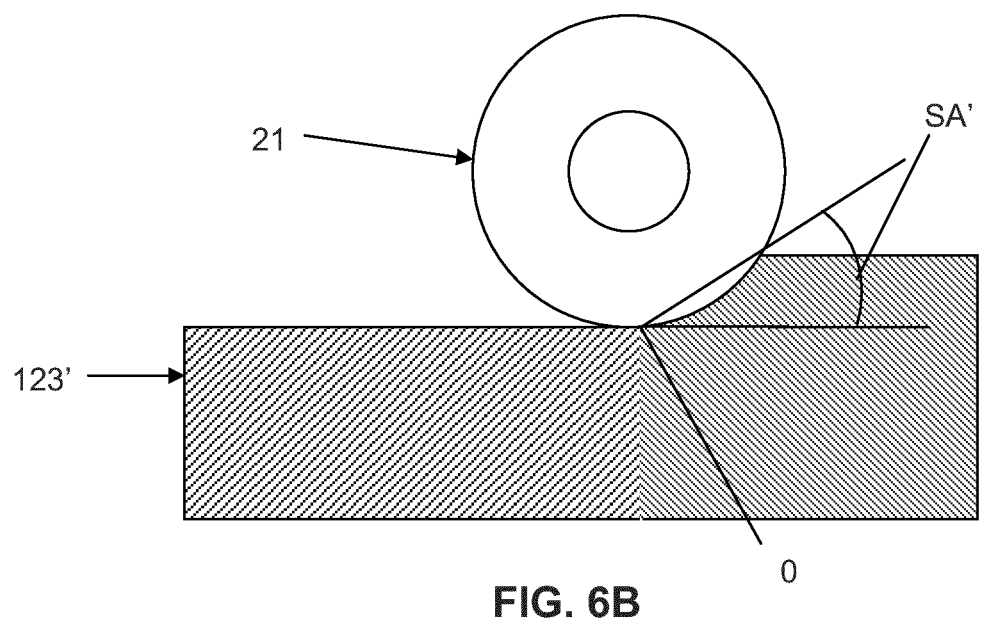

An evolutive wedge angle can be achieved, for example, by varying the clearance angle between the clearance edge portion 31 and the central axis X of the insert as a function of at least circumferential position about a central axis of the insert relative to a vertex 0 (FIGS. 3 and 4) of a setting angle. FIG. 6A shows a workpiece 123 being cut by an insert 21 and having a setting angle SA vertex at point 0, and FIG. 6B shows a workpiece 123' being cut by an insert 21 and having a setting angle SA' vertex at point 0, wherein the depth of cut and, consequently, the setting angle SA in FIG. 6A is greater than the depth of cut and setting angle SA' in FIG. 6B. The manner by which the clearance angle varies can be measured relative to other features instead of or in addition to the vertex of the setting angle. For example, in an insert such as is shown in FIG. 3, the clearance angle might be considered to vary depending upon the angular position measured about the axis X of the insert 21 between some arbitrary starting point on the circumferential cutting edge 33 of the insert and another point on the cutting edge.

As seen, for example, in FIGS. 2A and 2B, a land surface 37 can be provided between the clearance edge portion 31 and the top edge portion 25. Usually, the land surface 37 is disposed between the cutting edge 33 and the top edge portion 25, i.e., radially inward of the cutting edge. As seen by comparing the width of the land surface 37 in FIG. 2A with the width of the land surface 37 in FIG. 2B, as with the wedge angle WA and the clearance angle CA, the width of the land surface 37 can vary as a function of circumferential position about the central axis of the insert relative to, e.g., the vertex of the setting angle. It will be appreciated that varying the width of the land surface 37 can result in a change in the wedge angle, such as where the clearance angle is held constant and a change in the width of the land surface corresponds to a change in the top edge surface angle TA, e.g., a wider land surface corresponding to a larger top edge surface angle.

As seen with reference to, e.g., FIG. 2B, the top surface 23 and the top edge portion 25 typically form non-zero angles with a plane P perpendicular to the central axis X of the insert. As with the clearance angle CA, the top edge surface angle TA can vary relative to a plane perpendicular to the central axis of the insert as a function of circumferential position about the central axis of the insert relative to, e.g., the vertex of the setting angle. Thus, by decreasing or increasing the top edge surface angle TA the wedge angle WA can increase or decrease without necessarily changing the clearance angle CA. Similarly, by decreasing or increasing the clearance angle CA, the wedge angle WA can increase or decrease without necessarily changing the top edge surface angle. Further, the wedge angle WA can be kept constant while varying both the clearance angle CA and the top edge surface angle TA. For purposes of discussion, inserts with wedge angles that vary as a consequence of changing clearance angles are primarily described herein, it being understood that wedge angles could be varied by varying angles in addition to or instead of clearance angles.

The insert 21 includes a bottom surface 39. The bottom surface 39 is typically flat to facilitate seating of the insert on a correspondingly flat surface (125, FIGS. 5A-5C) in an insert-receiving recess (127). The insert 21 can include an integrated anvil or shim 41 as shown in, e.g., FIGS. 1A-1B, 1C-1D, 3, 5A, and 5C, however, no integrated shim need be provided and, if desired, a separate shim can be used, or no shim at all. The insert 21 will typically have a through hole 43. A threaded portion of a bolt 45 (FIGS. 5A-5C) can extend through the through hole 43 and external threads (not shown) on the bolt can mate with internal threads (not shown) in the toolholder (121, FIGS. 5A-5D) to bolt the insert 21 in the recess of the toolholder.

As seen in FIG. 3, from point 0 to point 1 at a setting angle SA1, the clearance angle might decrease (and thus the wedge angle might increase) or "evolve" from a first value CA0 (for example, 15°) to a second value CA1 (for example 11°); from point 1 to point 2 at a setting angle SA2, the clearance angle might remain constant so that CA1=CA2 (for example, 11°); from the point 2 to the point 3 at a setting angle SA3, the clearance angle might increase from CA2 to a greater value CA3 (for example, 15°), which will ordinarily be equal to CA0. For an insert indexable to four positions as seen in FIG. 3, the angle measured from the centerline X of the insert 21 between point 1 and point 2, i.e., the portion with a constant clearance angle, will ordinarily be between 10° and 80°. For inserts indexable to two positions, the angle measured from centerline X between point 1 and point 2 will ordinarily be between 10° and 170°; for inserts indexable to three positions, the angle measured from centerline X between point 1 and point 2 will ordinarily be between 10° and 110°; for inserts indexable to six positions, the angle measured from centerline X between point 1 and point 2 will ordinarily be between 10° and 50°; and for inserts indexable to eight positions, the angle measured from centerline X between point 1 and point 2 will ordinarily be between 10° and 35°. Other aspects of the present invention might involve the clearance angle increasing and/or wedge angle decreasing from a smallest value proximate the vertex of the setting angle to a largest value remote from the vertex of the setting angle.

Usually, but not always, the insert 21 comprises at least one indicia, and the clearance angle CA can be considered to vary as a function of circumferential position about the central axis X of the insert relative to the at least one indicia. The indicia may comprise a surface, typically a flat or curved surface, on the side surface 27. The surface typically functions as an insert-supporting surface 35 that supports the insert against an abutment surface (135, FIGS. 5A-5C) in the recess (127) of the toolholder (121). Other forms of indicia may comprise, for example, marks or other features formed or marked on the insert. The insert 21 will ordinarily be indexable to the same number of different positions as there are insert-supporting surfaces 35 on the side surface 27.

It will be appreciated that the manner by which the clearance angle varies relative to the vertex 0 of the setting angle will typically be the same or similar as the manner by which the clearance angle varies relative to any indicia, however, the indicia need not be disposed at the same spot as the vertex 0 of the setting angle. For example, FIG. 4 shows how a line LISS lying on a flat insert-supporting surface and that is perpendicular to the central axis X of the insert might form a non-zero angle Y to a line LTAN tangent to the cutting edge at the vertex 0 of the setting angle.

Figure 4:
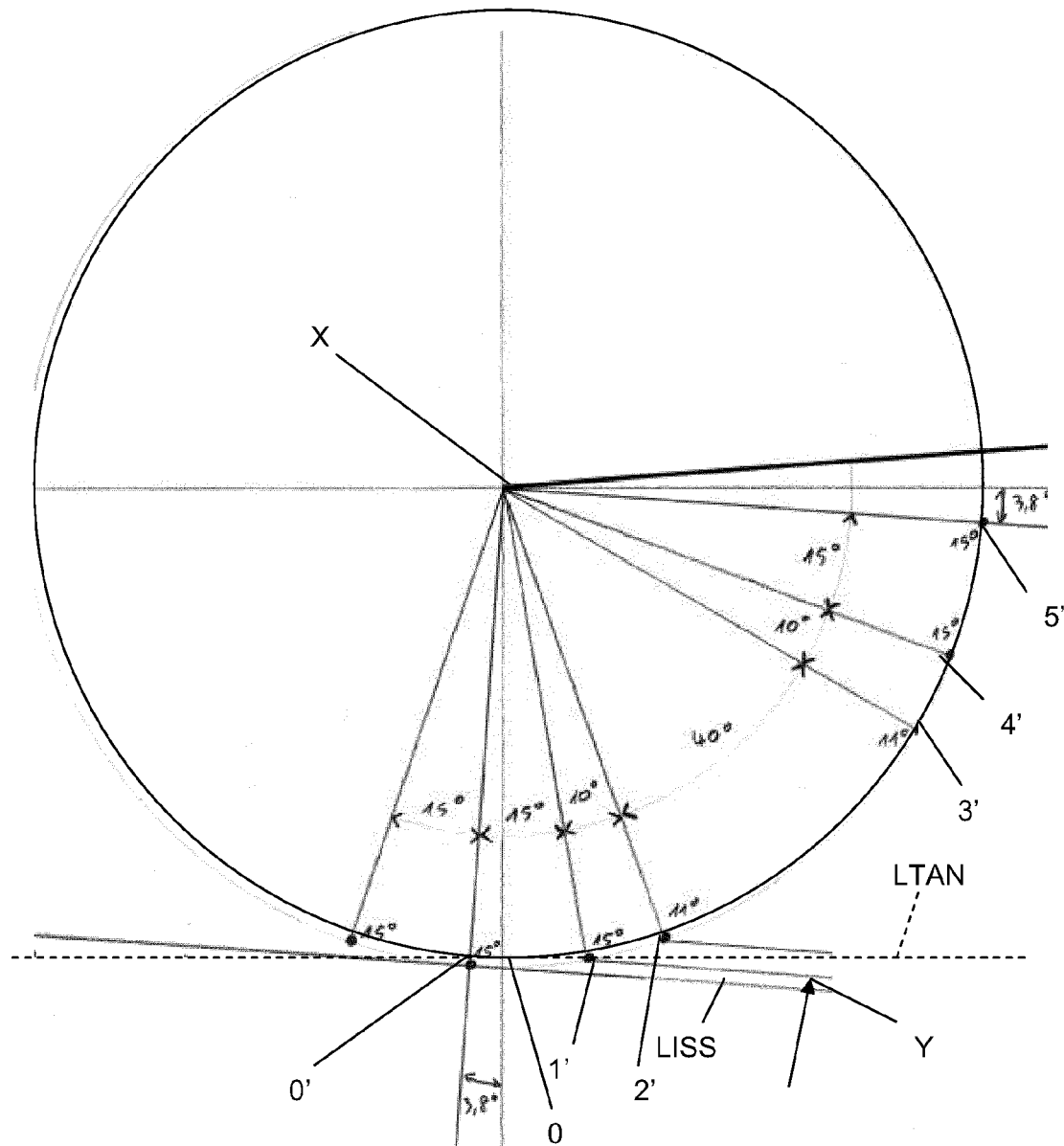
FIG. 4 schematically shows how clearance angles of an insert can vary around the circumference of the insert.

In an insert having the evolutive clearance/wedge angle arrangement shown in FIG. 4, from point 0' to point 1' (extending through a 15° arc), the clearance angle might remain constant at a first value CA1=CA0 (for example, 15°); from point 1' to point 2' (extending through a 10° arc), the clearance angle might decrease to a second value CA2 (for example, 10°); from the point 2' to the point 3' (extending through a 40° arc), the clearance angle might remain constant so that CA2=CA3 (for example, 10°); from the point 3' to the point 4' (again extending through a 10° arc), the clearance angle might increase from CA3 to a greater value CA4 (for example, 15°), which will ordinarily be equal to CA0; and, from point 4' to point 5' (again extending through a 15° arc), the clearance angle might remain constant so that CA4=CA5=CA0 (for example, 10°). The vertex 0 of the setting angle is rotated counter-clockwise about the axis X by a certain amount (3.8° shown) relative to the point 0'.

Depending upon how many positions the insert 21 is capable of being indexed to, the cycle from a first clearance angle to a second clearance angle and then back to the first clearance angle will ordinarily repeat as one continues around the circumference of the insert the same number of times as the insert is indexable. Inserts having evolutive clearance angles that cycle every 90° about the 360° circumference of the insert, i.e., four times, as shown in FIGS. 3 and 4 are indexable four times.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application No. 10191799.5, from which this application claims priority, are incorporated herein by reference.

What is claimed is:

1. An indexable circular cutting insert comprising:
   a top surface including a land surface adjacent to a top edge portion;
   a side surface including a clearance surface and a clearance edge portion, the clearance edge portion forming a clearance angle with a central axis of the insert;
   a cutting edge defined by an intersection of the clearance edge portion and the land surface, wherein the clearance edge portion and the top edge portion form a wedge angle such that the wedge angle varies as a function of circumferential position about the central axis of the insert relative to a point on the cutting edge, the cutting insert being indexable to a plurality of different indexing positions, and wherein the wedge angle varies between a maximum and a minimum value as a function of circumferential position about the central axis of the insert relative to the point on the cutting edge corresponding to each indexing position and the clearance angle varies as a function of circumferential position about the central axis of the insert relative to the point on the cutting edge.

2. The circular cutting insert as set forth in claim 1, wherein the insert comprises at least one indicia, the wedge angle varying as a function of circumferential position about the central axis of the insert relative to the at least one indicia.

3. The circular cutting insert as set forth in claim 2, wherein the at least one indicia is a flat surface on the side surface.

4. The circular cutting insert as set forth in claim 1, wherein the cutting edge lies substantially entirely in a single reference plane.

5. The circular cutting insert as set forth in claim 1, wherein a width of the land surface varies as a function of circumferential position about the central axis of the insert relative to the point on the cutting edge.

6. The circular cutting insert as set forth in claim 1, wherein the top edge portion forms a top edge portion angle with a plane perpendicular to the central axis of the insert.

7. The circular cutting insert as set forth in claim 6, wherein the top edge portion angle varies as a function of a circumferential position about the central axis of the insert relative to the point on the cutting edge.

8. The circular cutting insert as set forth in claim 1, wherein the cutting insert is indexable to four different positions.

9. The circular cutting insert as set forth in claim 1, wherein the wedge angle has a minimum value proximate the point on the cutting edge.

10. The circular cutting insert as set forth in claim 1, wherein the wedge angle is constant over at least a portion of the cutting edge.

11. A cutting tool, comprising:
    a cutting insert, the cutting insert having a top surface including a land surface adjacent to a top edge portion, a side surface including a clearance surface and a clearance edge portion, wherein a cutting edge is defined by an intersection of the clearance edge portion and the land surface, the clearance edge portion forming a clearance angle with a central axis of the insert and the clearance edge portion and the top edge portion forming a wedge angle such that the wedge angle varies as a function of circumferential position about a central axis of the insert relative to a point on the cutting edge, the cutting insert being indexable to a plurality of different indexing positions, and wherein clearance angle varies as a function of circumferential position about the central axis of the insert relative to the point on the cutting edge and the wedge angle varies between a maximum and a minimum value as a function of circumferential position about the central axis of the insert relative to the point on the cutting edge corresponding to each indexing position; and a toolholder having a recess in which the cutting insert is mounted so that the point on the cutting edge forms a vertex of a setting angle of the insert.

\* \* \* \* \*